United States Patent
Mattila et al.

(10) Patent No.: US 11,526,169 B2
(45) Date of Patent: Dec. 13, 2022

(54) NAVIGATION SYSTEM WITH INDEPENDENT CONTROL OF LATERAL AND LONGITUDINAL THRUST

(71) Applicant: KONGSBERG MARITIME SWEDEN AB, Kristinehamn (SE)

(72) Inventors: Mikko Mattila, Helsinki (FI); Daniel Ahl, Karlstad (SE); Marko Vikstrom, Hammaro (SE)

(73) Assignee: KONGSBERG MARITIME SWEDEN AB, Kristinehamn (SE)

( * ) Notice: Subject to any disclaimer, the term of this patent is extended or adjusted under 35 U.S.C. 154(b) by 394 days.

(21) Appl. No.: 16/758,129

(22) PCT Filed: Oct. 22, 2018

(86) PCT No.: PCT/EP2018/078846
§ 371 (c)(1),
(2) Date: Apr. 22, 2020

(87) PCT Pub. No.: WO2019/081405
PCT Pub. Date: May 2, 2019

(65) Prior Publication Data
US 2020/0285239 A1 Sep. 10, 2020

(30) Foreign Application Priority Data
Oct. 23, 2017 (SE) .................................... 1751310-2

(51) Int. Cl.
*G05D 1/02* (2020.01)
*B63H 25/04* (2006.01)
(Continued)

(52) U.S. Cl.
CPC ........... *G05D 1/0206* (2013.01); *B63H 25/04* (2013.01); *B63H 25/06* (2013.01); *B63B 49/00* (2013.01);
(Continued)

(58) Field of Classification Search
CPC ........ G05D 1/02; G05D 1/0206; B63H 25/00; B63H 25/04; B63H 25/06; B63H 25/38; B63H 2025/066
(Continued)

(56) References Cited

U.S. PATENT DOCUMENTS 6,178,907 B1    1/2001 Shirah et al.

FOREIGN PATENT DOCUMENTS

| CN | 101342937 | 1/2009 |
| CN | 106652647 | 5/2017 |

(Continued)

OTHER PUBLICATIONS

International Search Report and Written Opinion issued in PCT/EP2018/078846 dated Feb. 5, 2019.
(Continued)

*Primary Examiner* — Lars A Olson
(74) *Attorney, Agent, or Firm* — Foley & Lardner LLP

(57) ABSTRACT

Various aspects provide for a propulsion system (200) for a ship (100) comprising at least first and second thrusters (205, 206) and first and second directors (220, 720), wherein a computing platform (300) is coupled to the thrusters and directors being configured to receive desired longitudinal and lateral headings (750, 760) and determine a configuration of the propulsion system that is expected to propel the ship in the desired longitudinal and lateral headings.

17 Claims, 9 Drawing Sheets

(51) Int. Cl.
  *B63H 25/06* (2006.01)
  *B63H 25/38* (2006.01)
  *B63B 49/00* (2006.01)
(52) U.S. Cl.
  CPC ........ *B63H 25/38* (2013.01); *B63H 2025/045* (2013.01); *B63H 2025/066* (2013.01)
(58) Field of Classification Search
  USPC ............................................ 701/21; 114/163
  See application file for complete search history.

(56) References Cited

FOREIGN PATENT DOCUMENTS

| JP | 114501 C | 9/1935 |
| JP | H648394 | 2/1994 |
| JP | H858696 | 3/1996 |
| JP | 2001-219899 A | 8/2001 |
| JP | 2009-179087 | 8/2009 |
| JP | 2014-118059 | 6/2014 |
| JP | 2017-178290 | 10/2017 |
| WO | WO-2017/168802 A1 | 10/2017 |

OTHER PUBLICATIONS

International Preliminary Report on Patentability for PCT/EP2018/078846 dated May 7, 2020 (9 pages).

NAVIGATION SYSTEM WITH INDEPENDENT CONTROL OF LATERAL AND LONGITUDINAL THRUST

CROSS-REFERENCE TO RELATED APPLICATIONS

This application claims priority to PCT/SE2018/078846, filed Oct. 22, 2018, entitled "NAVIGATION SYSTEM WITH INDEPENDENT CONTROL OF LATERAL AND LONGITUDINAL THRUST," which claims priority to Swedish Patent Application No. 1751310-2, filed Oct. 23, 2017, all of which are incorporated by reference in their entirety.

BACKGROUND

1. Technical Field

The present invention relates generally to marine navigation, and more particularly to ship propulsion systems capable of complex maneuvers.

2. Description of Related Art

A ship propulsion system typically has a propeller, screw, or similar vaned apparatus, driven by an engine or motor to generate forward or reverse thrust to propel the ship forward or backward. Steering and navigation require the generation of a lateral thrust, typically at the stern of the ship. A rudder or nozzle may redirect longitudinally flowing water toward a lateral direction, changing the ship's course.

Some propulsion systems have separate components to impart longitudinal and lateral forces. A typical large ship has a fixed-axle propeller connected directly to the engine (for forward/backward thrust) and a rudder aft of the propeller to generate lateral thrust. Some propulsion systems combine lateral with the longitudinal thrust. For example, an azimuthing thruster (e.g., a pod-based propeller) may be rotated toward the port or starboard sides, directing a portion of its thrust laterally. A water jet may include a nozzle that directs a portion of the jet of water laterally. Azimuthing thrusters and water jets provide high maneuverability, but this maneuverability comes at the expense of lower fuel efficiency, especially during straight-ahead steaming (e.g., over the open ocean).

The propulsion system's capabilities are normally specified by the ship's performance requirements, which are typically associated with an expected usage of the ship. Some ships prioritize higher maneuverability; a ferry or cruise ship that operates close to shore might need to navigate narrow fjords or tight harbors. Some ships prioritize higher fuel efficiency; a tanker or container ship that travels from Asia to Europe might need to minimize fuel costs. Reduced pollution is often desired (e.g., from a ferry in a densely populated area). Some ships are required to have higher speed.

The expected type and usage of the ship have historically determined the choice of propulsion system, but the drawbacks of prior propulsion systems have forced compromise. A cruise ship with azimuthing thrusters might navigate tortuous passages well, but consume more fuel than a similarly specified ship having a fixed-axle/rudder propulsion system. Conversely, a tanker having fixed-axle/rudder propulsion might have good fuel economy during open-ocean steaming, but poor maneuverability during berthing. For large ships with fixed-axle propulsion, tugs are typically required for harboring, berthing, and the like, creating additional fuel consumption and emissions resulting from tug usage.

As voyage distance and ship size increase, the propulsion system is typically chosen to maximize fuel efficiency, guiding the artisan toward fixed-axle propeller/rudder systems. When fuel costs trump navigational requirements, the fuel savings of a fixed-axle/rudder propulsion system typically outweigh the maneuverability advantages of alternative propulsion systems having directable thrust (e.g., azimuth, water jet). Thus, many ferries, most cruise ships and typically all large cargo ships (container ships, tankers and the like) use a fixed-axle propeller/rudder system. However, such large ships require tugboat-assisted navigation near shore. Large ships could benefit from the navigational flexibility typically associated with azimuthing or water-jet systems, if not for the expense of increased fuel consumption. By increasing the navigational capabilities of such large ships "close to shore," large-scale shipping may be made more efficient.

Conversely, ships requiring higher maneuverability (that typically requires pod or jet propulsion) could benefit from better fuel efficiency, provided the maneuverability requirements were met. A ferry or cruise ship that normally requires an azimuthing thruster system would benefit from reduced fuel consumption and lower emissions, provided the propulsion system meets the navigational requirements.

For propulsion systems for "typical" ships designed to transport goods or people between points (e.g., having a bow, stern, self-propelled speed over 10 knots, and the like, e.g., cargo ships, tankers, cruise ships, and ferries) it is challenging to impart an exclusively lateral thrust (e.g., to move sideways without moving forward or backwards). A rudder may redirect water laterally, but the redirected water still has a longitudinal component: the ship turns, but continues to move forward or backward. This limitation may be a problem in certain navigational situations (e.g., a lateral docking maneuver into a tight berth, akin to "parallel parking" in the automotive world). In such situations, tugboats are typically required to provide tight navigation control, turning radii, and lateral movement. Tugboats are costly and emitting; reducing the need for tugboats may significantly improve operational efficiency and reduce pollution.

It may be advantageous to impart an exclusively lateral thrust on the ship (e.g., to move the ship to port or starboard without moving forward or backward). Lateral movement without forward movement may enable significantly improved accident-avoidance protocols. By moving sideways without moving forward, a ship might avoid another oncoming vessel. Certain vessels that are designed for dynamically positioned stationary operation use azimuthing propulsion. For example, floating oil platforms may be actively controlled to remain stationary, and so use azimuthing thrusters. However, such vessels have poor fuel economy during steaming (and in many cases, cannot self-propel for significant distance).

Complicated navigational maneuvers typically require an expert captain/skipper, typically located on the ship. Berthing may require that a harbor pilot be helicoptered or ferried out to a vessel so the harbor pilot may navigate the ship into the harbor. Automation of these maneuvers may reduce, or even eliminate, the need for local navigational expertise.

Typically, a significant portion of capital and operating expense is directed toward supporting and ensuring the safety of human passengers. Automation may reduce (or even eliminate) the need for a local (e.g., shipboard) human presence, resulting in reduced cost and increased safety. Cost of implementation is often a barrier. As such, technology that provides a more cost-effective solution to a technical problem may enable the commercialization of technology that might otherwise be economically undesired by the market.

SUMMARY

Various embodiments provide a propulsion system that combines the fuel efficiency of a fixed-axle/rudder propulsion system with the maneuverability of an azimuthing (e.g., pod or water-jet) propulsion system. By increasing both fuel efficiency and maneuverability, ships may be more fuel-efficient, less polluting, less requiring of tug-assisted navigation, and more easily navigated near fjords, harbors, berths, and the like. A ship having at least two (e.g., three) propellers, at least two rudders and/or nozzles, and a particular computing platform as described herein may have the fuel-efficiency advantages of a fixed-axle propulsion system in combination with the navigational capabilities of an azimuthing or jet-based propulsion system. Various aspects may improve performance of ships that steam for some time, then dynamically remain in place, such as FPSO, FSO, FDPSO, and/or FSRU.

A propulsion system configured to independently control longitudinal and lateral thrusts to navigate a ship may comprise first and second thrusters (e.g., fixed-axle propellers), each having an independently controllable thrust, and first and second directors (e.g., rudders and/or nozzles), each configured to independently redirect a portion of the water flowing past a ship toward a lateral direction. Thrusters and directors may be arranged laterally and/or longitudinally with respect to each other. In certain cases, a thruster and director may be integrated, as in a pod-based propeller (in which the propeller spin axis rotates about a steering axis) or a water jet (in which a nozzle directs the flow of water exiting the propeller).

A first thruster is configured to generate a first thrust to propel the ship forward or backward, and a first director is configured to direct flowing water (e.g., the first thrust) over a range of first director angles. A second thruster is configured to generate a second thrust, independent of the first thrust (the same as or different, as desired), to propel the ship forward or backward, and a second director is configured to direct flowing water (e.g., the second thrust) over a range of second director angles, independent of the first director angles (the same or different, as desired).

A platform comprising at least a processor and memory (and typically a communications interface) and in communication with the thrusters and directors is configured to receive a target location to which the ship should be propelled, receive and/or calculate a desired longitudinal heading defining a desired forward/backward displacement of the ship to reach the target location, and receive and/or calculate a desired lateral heading defining a desired lateral displacement of the ship to reach the target location. The headings typically comprise a direction and magnitude (which may be zero). The platform calculates a longitudinal thrust vector expected to yield the desired longitudinal heading when imparted to the ship, and a lateral thrust vector expected to yield the desired lateral heading when imparted to the ship. The platform calculates, identifies, or otherwise selects an operating configuration of the thrusters and directors (e.g., magnitude of each thrust and direction of each director) that meets certain criteria. When propelled pursuant to the selected operating configuration, the ship may then move in the desired longitudinal and lateral headings.

A criterion may include an operating condition of the propulsion system and ship for which a summation of (a first long.vector comprising a net longitudinal thrust generated by the first thruster and first director) plus (a second long.vector comprising a net longitudinal thrust generated by the second thruster and second director) results in the calculated longitudinal thrust vector that is expected to yield the desired longitudinal heading. A criterion may include an operating condition for which a summation of (a first lat.vector comprising a net lateral thrust generated by the first thruster and first director) plus (a second lat.vector comprising a net lateral thrust generated by the second thruster and second director) results in the calculated lateral thrust vector. By simultaneously fulfilling these criteria, the selected operating condition yields an arrangement of thrusters and directors in a way that imparts the desired longitudinal and lateral thrusts to the ship, yielding the desired longitudinal and lateral headings.

The selected operating condition may include information selected from a database (e.g., via a lookup table). The database is typically vessel-specific, and typically contains, for a wide range of environmental conditions, thrusts, and director angles, a concomitantly wide range of lat.vectors and long.vectors. The selected operating condition may be calculated dynamically (e.g., iteratively as needed). Various aspects comprise optimization subroutines (e.g., numerical minimization between a difference between a desired heading and actual heading). A "closed loop" algorithm that iteratively reduces a deviation between desired and actual headings (e.g., PID, proportional/integral/derivative and/or an algorithm comprising a numerical method for minimization (Newton's, Least-Squares, Steepest-Descent, Monte-Carlo, and the like) may be used. A benchmark operating condition (e.g., for no wind, no waves, full load, temperature, and the like) may be combined with various sensors (e.g., wind, load, power) to calculate an operating condition. Selecting an operating condition may comprise extracting information from a lookup table and/or calculating information (e.g., using sensor data). Pursuant to a desired net thrust (e.g., in combination with environmental effects such as load, wind and current), the platform selects an operating condition that yields the desired thrust vectors. This operating condition is typically used to navigate the ship, and the resulting motion (e.g., the deviation between actual and desired lateral and longitudinal headings) is used to recalculate/reselect an updated operating condition. Closed-loop control of the propulsion system (desired vs. actual effect) may be used to iteratively update the present operating condition in order to achieve a desired heading. Typically, the lookup table is updated as the effect of different operating conditions on ship headings is manifest. By using canonical "reduced" vectors as proxies for the complex flow fields typically associated with CFC models, iterative updating of tables may reduce, or even eliminate, the need for repeatedly recalculating complicated CFD models.

Independent control may include configuring the first thruster to generate a forward thrust while the second thruster generates a reverse thrust. Independent control may include configuring the first director to "point" to starboard, while the second director "points" to port. A configuration may result in a substantially zero longitudinal thrust yet a nonzero lateral thrust to port or starboard. Thrust from the first thruster may be different than thrust from the second thruster. The director angle of the first director may be different than that of the second director.

A ship (e.g., with a bow, a stern, an appreciable self-propelled maximum speed (e.g., over 5 knots, including over 10 knots), and a draft greater than 3, or even above 5 meters), may comprise a propulsion system having thrusters configured to generate thrust and directors configured to direct the thrust in lateral directions. A ship need not have a draft greater than 3 meters, and need not have a self-propelled maximum speed that exceeds 10 knots. A computing platform in communication with the thrusters and directors may coordinate the thrusters and directors to achieve a desired combination of longitudinal and lateral thrust that yields a desired longitudinal heading and a desired lateral heading independent of the desired longitudinal heading.

The ship may have a starboard thruster comprising a fixed-axle propeller configured to generate a first thrust to propel the ship forward or backward and a starboard director comprising a rudder and/or nozzle and configured to direct the first thrust over a range of starboard director angles. The ship may have a port thruster comprising a fixed-axle propeller configured to generate a second thrust, independent of the first thrust, to propel the ship forward or backward, and a port director comprising a rudder and/or nozzle and configured to direct the second thrust over a range of port director angles, independent of the starboard director angles. The ship may have a center thruster comprising a propeller (e.g., a fixed-axle propeller) and configured to generate a third thrust to propel the ship forward or backward, independent of the first and second thrusts.

The ship includes a platform comprising a processor, memory, and communications interface (e.g., to communicate with a command console that issues navigation instruction data) configured to receive a target location toward which the ship should be propelled. Using the target location data, the platform calculates a desired longitudinal heading defining a desired forward/backward displacement of the ship to reach the target location and a desired lateral heading defining a desired lateral displacement of the ship to reach the target location. Using these headings, the platform calculates a longitudinal thrust vector expected to yield the desired longitudinal heading when imparted to the ship and a lateral thrust vector expected to yield the desired lateral heading when imparted to the ship.

According to the desired thrust vectors, the platform selects (e.g., calculates, extracts information from a lookup table and/or other database) an operating configuration of the thrusters and directors (e.g., magnitude of thrust from each propeller and director angle of each director) that meets certain criteria. The thrusters and directors are typically operated independently. The starboard director angle may be the same or different than the port director angle, and the magnitude of the thrust generated by the starboard thruster may be the same or different than the magnitude of the thrust generated by the port thruster.

The selected criteria may include a summation of (a first long.vector comprising a net longitudinal thrust generated by the starboard thruster and starboard director) and (a second long.vector comprising a net longitudinal thrust generated by the port thruster and port director) and (a third long.vector comprising a longitudinal thrust generated by the center thruster) results in the calculated longitudinal thrust vector (e.g., within a thrust tolerance). The criteria may also include a summation of (a first lat.vector comprising a net lateral thrust generated by the starboard thruster and starboard director), and (a second lat.vector comprising a net lateral thrust generated by the port thruster and port director) results in the calculated lateral thrust vector (e.g., within a thrust tolerance). The platform may then send the selected operating configuration to the command console and/or directly to the propulsion system to propel the ship in the desired longitudinal and lateral headings.

Maneuverability may be enhanced by imparting relatively large lateral thrusts as compared to longitudinal thrusts. A lateral thrust vector may have a magnitude that is larger than the longitudinal thrust vector, particularly at least twice as large, particularly at least ten times as large. The longitudinal thrust vector may correspond to substantially zero forward/backward thrust, yet the lateral thrust vector corresponds to a nonzero lateral thrust. Such a combination of vectors may be used to move the ship sideways without moving forward or backward. In some cases, a ship may be rotated around its prow to change direction within a very tight radius. In some cases (e.g., with a bow, swingdown, and/or tunnel thruster) a ship may be propelled to rotate around its midpoint (e.g., "spin").

A magnitude of the longitudinal component of the thrust generated by the center thruster may be within 20%, particularly within 10%, particularly within 5%, of the magnitude of the sum of the first long.vector (650) and second long.vector comprising the net longitudinal thrusts generated by the starboard and port thrusters. The magnitude of the longitudinal component of the thrust generated by the center thruster may be substantially equal to the magnitude of the sum of the first and second long.vectors, particularly wherein the thrust of the center thruster is in the opposite direction to the thrusts of the starboard and port thrusters. "Substantially equal to" typically allows for a small deviation from a desired value that does not affect performance. In certain navigation operations, the selected operating configuration is such that the starboard and port thrusters are configured to thrust in the opposite direction of the center thruster. For example, the starboard and port thrusters may thrust forward while the center thruster thrusts backward, or vice versa. The thrusts may have a magnitude such that that their longitudinal and/or lateral components cancel each other.

The platform may be configured to iteratively (substantially continuously) receive location information, update the headings, update the desired thrust vectors, and correspondingly update the operating configurations. The platform may receive an updated position of the ship from at least one ship sensor (e.g., a GPS sensor), calculate an updated longitudinal heading defining the desired forward/backward displacement of the ship, calculate an updated lateral heading defining the desired lateral displacement of the ship.

Using these updated headings, the platform then calculates updated longitudinal and lateral thrust vectors expected to yield the updated longitudinal and lateral headings and selects an updated operating configuration such that a summation of the first long.vector, and second long.vector and optionally third long.vector results in the updated longitudinal thrust vector, and a summation of the first lat.vector and the second lat.vector results in the updated lateral thrust vector. The platform may then send the updated operating configuration to the thrusters and directors (e.g., via a command console) to propel the ship in the desired updated headings. A "closed loop" iteration, in which ship position data are used to dynamically update headings and subsequent thrust vectors, may allow the ship to "home in" on a desired location. By combining substantially autonomous navigation with high fuel efficiency, environmental impact may be reduced while safety is increased. Without the need

DETAILED DESCRIPTION

A propulsion system for a ship may comprise first and second thrust apparatus, each configured to generate forward or reverse thrust. The thrust apparatus may be operated independently, such that they generate different thrusts. For example, a first thrust apparatus may generate a forward thrust while a second thrust apparatus may generate a rearward thrust.

Water (e.g., thrust generated by the thrust apparatus) may be directed laterally by a director, such as a rudder or a nozzle. A first director may direct thrust from the first apparatus, and a second director may direct thrust from the second apparatus. The directors may be operated independently. For example, a leading edge of one director may be oriented toward starboard while the leading edge of another director is oriented toward port.

Thrusts from the thrusters and the angles of lateral direction from the directors may be adjusted independently to achieve a desired combination of lateral thrust, independent of longitudinal thrust. For example, the directors and thrusters may be configured such that the longitudinal component of their thrusts cancel each other out (thus the ship does not move forward/backward) yet yield sufficient lateral thrust to move the ship sideways. Typically, a thruster comprises a fixed-axle propeller, and a director comprises a rudder and/or nozzle. A thruster may comprise an azimuthing thruster.

Figure 1:
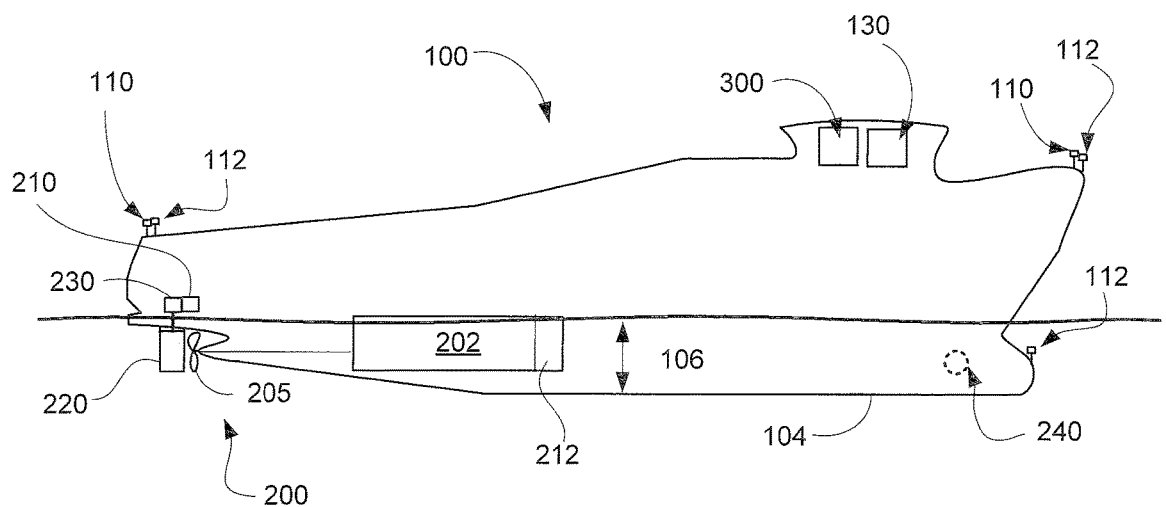
FIG. 1 illustrates a ship, according to some embodiments.

FIG. 1 illustrates a ship, according to some embodiments. A ship 100 may comprise a propulsion system 200 and various apparatus to command and control the ship, as represented by command console 130. Command console 130 may include a human-machine interface (e.g., a joystick, a wheel, a trackball). Command console 130 may communicate with other apparatus (e.g., an off-ship master control center) to receive navigational instructions. A ship may have a hull 104 that typically has a length greater than 20 meters, including above 50 meters, including over 100 meters. A ship may have a draft 106 greater than 5 meters, including above 8 meters, particularly above 10 meters, including above 15 meters.

Propulsion system 200 may comprise a thruster 205 (e.g., a fixed-axle propeller) powered by an engine 202 (or motor, turbine, and the like) to generate longitudinal thrust. Various thrust sensors 212 (e.g., engine rpm, engine load, power, and the like) may estimate or measure the thrust generated by the thruster. A director 220 (e.g., a rudder, a nozzle, and the like) is configured to redirect flowing water laterally, imparting a lateral thrust to the ship. Typically, a rudder/nozzle is located immediately aft of a propeller, such that flow from the thruster passes directly past/through the director. A thruster and director may be integrated (e.g., as in a pod or water jet); for simplicity, they are illustrated herein as discrete propellers and rudders.

The director may be monitored by one or more director sensors 210 (e.g., to sense rudder angle, torque on the director, and the like) and actuated by one or more director actuators 230 (e.g., to change rudder angle). An actuator may comprise a hydraulic actuator, an electric actuator, a screw/worm drive, and the like. A typical ship comprises at least two pairs of thrusters/directors.

The ship includes a computing platform 300 configured to communicate with the propulsion system, sensors, actuators, and command console, and optionally various onshore apparatus. Platform 300 may be discrete or integrated with command console 130. Platform 300 may function as an "autopilot"—dynamically adjusting and coordinating the thrusters and directors to achieve a desired combination of longitudinal and lateral thrusts to navigate the ship to a desired target location (e.g., based on a joystick position, GPS coordinate, and the like).

A ship may include various ship sensors 110 to sense the behavior of the ship. A ship sensor may include an accelerometer (e.g., to sense ship motion, such as from waves and/or contact with other objects). A ship sensor may sense pitch, yaw, vibrations, and the like. A ship sensor may include a location sensor (e.g., a GPS receiver) that identifies the global position of that sensor. Typically, a ship will include several location sensors (e.g., at the prow, and the bow, and at port and starboard sides).

A suitable number of location sensors (pursuant to ship size) may be distributed circumferentially around the ship (e.g., around the outer deck). Inasmuch as the precision of commercial GPS position sensors (below 10 cm) is much smaller than ship size (tens of meters), the position of each part of the ship may be independently measured with sufficient precision and accuracy for navigation. As such, the effect of varying thrust vectors (from the thrusters/directors) may be measured independently at different parts of the ship. The motion of each sensor (pursuant to an operating configuration of the propulsion system) may be used to update a database of operating configurations and conditions.

One or more environmental sensors 112 may sense the environment, particularly locally around the ship. An environmental sensor may include a wind velocity sensor configured to measure direction and speed of the wind proximate to that sensor, a water current sensor configured to measure direction and speed of water proximate to that sensor, a temperature sensor, a precipitation sensor, a humidity sensor, a wave sensor, and the like. A sensor may monitor draft 106 (e.g., as load increases/decreases).

In controlling the thrusters and directors to achieve a desired combination of longitudinal and lateral thrust, platform 300 may receive input from the various sensors associated with the ship, environment, and propulsion system to dynamically control the thrusters/directors. Typically, "closed loop" control (wherein feedback from the sensors is used to adjust the propulsion system) is used to iteratively control and/or modify thrust. In many situations, a finite lateral thrust is combined with a very low (even substantially zero) longitudinal thrust to "shimmy" the ship sideways. A ship may include an optional swing-up thruster and/or tunnel thruster (e.g., as represented by bow thruster 240) to enhance lateral navigation. For example, a bow thruster may thrust to starboard while the propulsion system thrusts to port, "spinning" the ship around a center axis.

Figure 2:
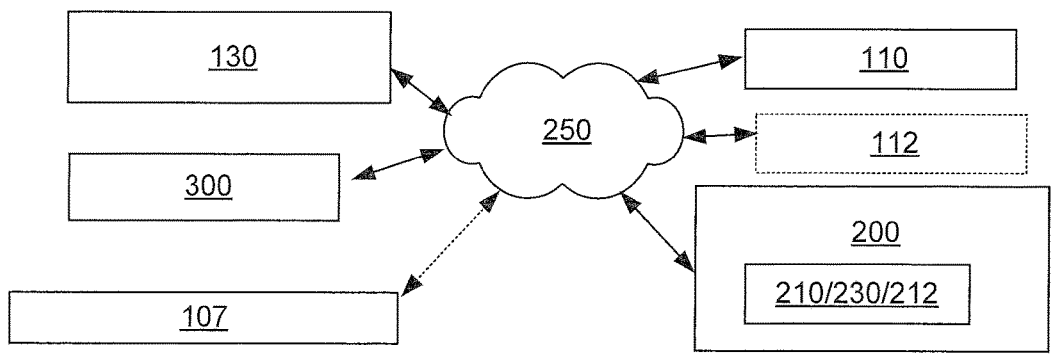
FIG. 2 is a schematic illustration of a network of components associated with some embodiments.

FIG. 2 is a schematic illustration of a network of components associated with some embodiments. A network 250 (e.g., a wireless, wired, and/or optical network) provides for communication among the command console, platform 300, various sensors, and the propulsion system. Some embodiments may incorporate feedback from environmental sensors; some may not. Some embodiments may incorporate feedback from a target location (e.g., associated with a GPS location), which may communicate via a cellular signal.

Figure 3:
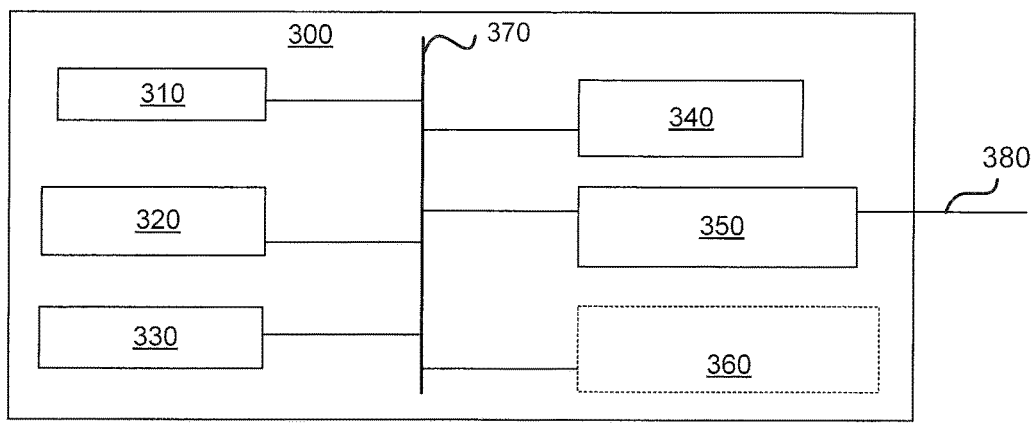
FIG. 3 illustrates additional detail regarding hardware incorporated into a computing platform, according to some embodiments.

FIG. 3 illustrates additional detail regarding hardware incorporated into a computing platform, according to some embodiments. Platform 300 may comprise hardware and software operable to perform unique methods and functions, and thus be a unique machine, notwithstanding any prior existence of various hardware components. In exemplary embodiments, platform 300 includes a variety of hardware components, including processor 310, memory 320, non-transitory storage 330, input/output (I/O) interface 340, communication interface 350, and optionally a display interface 360. These components may be generally connected via a system bus 370. Platform 300 may communicate (e.g., with network 250) via communication bus 380. In some embodiments, platform 300 includes a video card and/or display device (not shown).

Processor 310 may comprise any type of processor capable of processing the executable instructions (e.g., integrated circuits), and may include a cache, a multi-core processor, a video processor, and/or other processors.

Memory 320 may be any memory (e.g., non-transitory media) configured to store data. An example of memory 320 includes a computer readable storage medium, which may include any medium configured to store executable instructions. For example, the memory 320 may include, but is not limited to, storage devices such as RAM, ROM, MRAM, PRAM, flash memory, and the like.

Storage 330 may be any non-transitory media configured to receive, store, and provide data. Storage 330 may include a hard drive (e.g., having a magnetic disc), a solid-state drive (e.g., having static RAM), a tape drive (e.g, having a magnetic tape), an optical drive (e.g., having an optically read/write disc), and the like. Certain configurations include storage 330 as part of platform 300. In other configurations, storage 330 may be implemented remotely, for example as part of a remotely located database (not shown). Storage 330 may have stored thereon instructions executable by a processor to perform one or more methods described herein. Storage 330 may include a database or other data structure configured to hold and organize data, including operating configurations associated with the generation of various combinations of longitudinal and lateral thrust. Storage 330 may include historical operational data describing prior thrust conditions.

Input and output (I/O) may be implemented via I/O interface 340, which may include hardware and/or software to interface with various remotely located devices such as a user device (e.g., having a keyboard, touchscreen, mouse, pointer, push buttons, and the like). I/O interface 340 may be configured to communicate with the command console if the command console is implemented as a separate apparatus.

Communication interface 350 may communicate with various user devices, command consoles, apparatus, actuators, and the like, typically via network 250 (FIG. 2), and may include or be in communication with encryption hardware and/or software. Communication interface 350 may support serial, parallel, USB, firewire, Ethernet, and/or ATA communications. Communication interface 350 may also support 802.11, 802.16, GSM, CDMA, EDGE, GPS, Galileo, and various other wireless communications protocols, including commercial shipping protocols.

Optional display interface 360 may include any circuitry used to control and/or communicate with a display device, command console, and the like, such as an LED display, an OLED display, a CRT, a plasma display, and the like, and may include a video card and memory. A display interface may light a signal lamp and/or trigger an audible sound. In some configurations, a user device may include a video card and graphic display, and display interface 360 may communicate with the video card of the user device to display information.

The functionality of various components may include the use of executable instructions, which may be stored in memory 320 and/or non-transitory storage 330. Executable instructions may be retrieved and executed by processor 310, and may include software, firmware, and/or program code.

Platform 300 may be designed (typically with a simulation model of the ship and propulsion system) to dynamically calculate operating configurations for the propulsion system, according to desired combination of lateral and longitudinal headings. Navigation with azimuthing thrusters may be rather straightforward (aim thrust opposite the direction of desired travel). However, achieving complex navigational maneuvers with a fixed-axle/rudder system typically requires a combination of detailed computational models, active monitoring of system parameters, iterative calculation of operating conditions, closed-loop control (with sensors and actuators) to ensure the calculated operating condition is yielding the desired heading. To enable rapid calculation and comparisons, "canonical" vectors may be calculated from complex vector fields resulting from detailed CFD models. Using these canonical vectors may significantly increase computational speed.

Figure 4A:
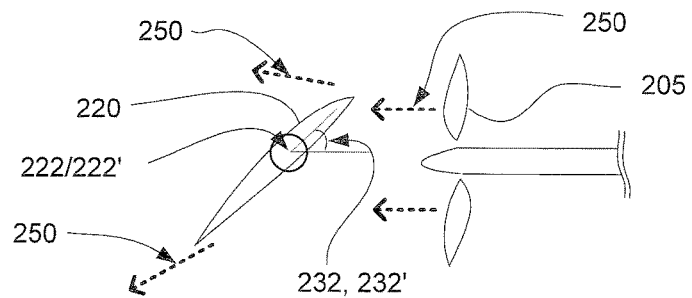
FIG. 4A is a schematic illustration of certain features of a simplified flow field, according to some embodiments.

FIG. 4A is a schematic illustration of certain features of a simplified flow field, according to some embodiments. FIG. 4A illustrates a looking "upwards" from beneath the ship. A thruster 205 (e.g., a propeller) generates a complex flow field as it accelerates the surrounding water. A director 220 (in this case, a rudder) rotates about an axis 222 to change the direction in which the director directs water flow. In FIG. 4A, director 220 is oriented at a nonzero director angle 232. The flow field is represented by a vector field of thrust vectors 250, which locally represent fluid flow ahead of, around, and behind the propulsion system. A major portion of the thrust vectors 250 typically point in the primary thrust direction (e.g., forward or backward, according to propeller spin). However, a portion of the thrust vectors point laterally and/or vertically (out of the page). As the fluid flows around a director, the flow field becomes even more complex, and as director angle increases, the flow field changes significantly. For large director angles, the flow field may include large eddies and thrust components in a wide range of vertical and horizontal directions.

The flow is much more complex than the common "intuitive" picture of a layperson. Calculation of the net effect of such complex flow on ship movement is typically computer-intensive. Thrust vectors 250 are typically calculated locally, such that a given operating condition might include thousands to millions of thrust vectors 250. For a relatively coarse representation, the localized flow may be represented as a vector field, with arrows representing direction and velocity (e.g., as in FIG. 4A). Computational Fluid Dynamics (CFD) simulations may be used to model (and in some cases, predict) the flow fields of thrust vectors under various conditions. The results of such complicated models are best conveyed with color or grayscale graphics, as follows.

Figure 4B:
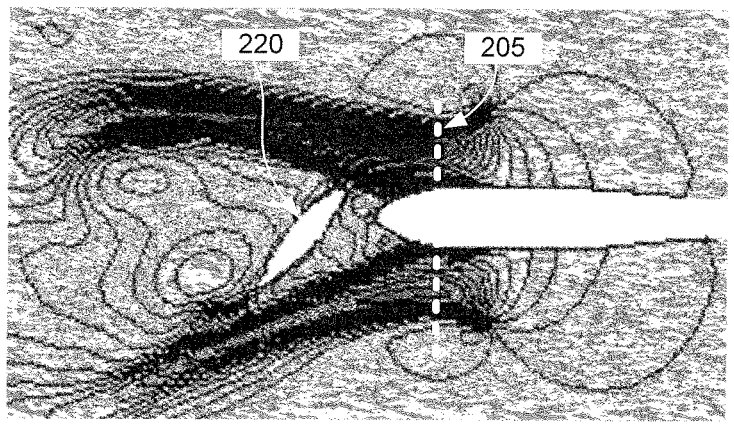
FIG. 4B is a schematic illustration of a simulated flow field, according to some embodiments.

FIG. 4B is a schematic illustration of a simulated flow field, according to some embodiments. FIG. 4B is a view from below the ship, looking upwards, and illustrates a flow field around a single propeller/rudder pair, at a particular engine power, propeller pitch, ship speed, set of environmental conditions, and with the rudder oriented at a finite director angle 232 (FIG. 4A). Propeller thrust is toward the left in FIG. 4B, pushing the stern of the ship to the right as drawn. As illustrated, the flow field is complex. Every combination of propulsion system configuration and environmental condition typically results in a different vector field.

Figure 4C:
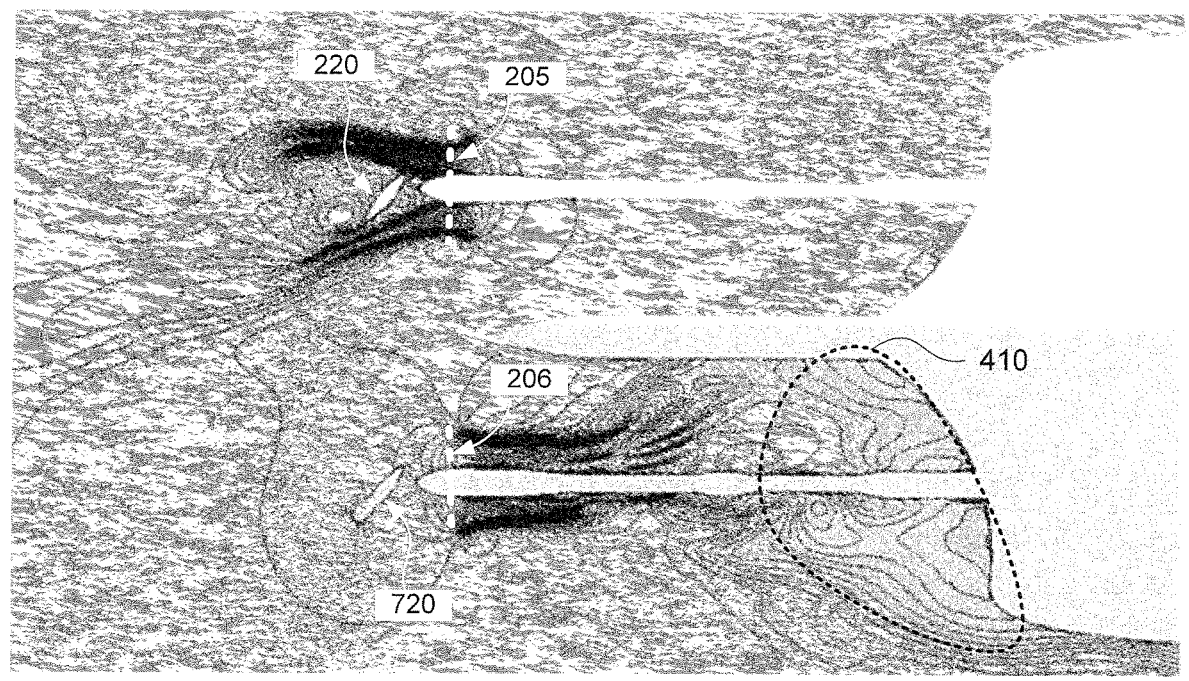
FIG. 4C is a schematic illustration of a simulated flow field for a ship having two fixed-axle propellers and two rudders, according to some embodiments.

FIG. 4C is a schematic illustration of a simulated flow field for a ship having two fixed-axle propellers and two rudders, according to some embodiments. FIG. 4C illustrates a propulsion system comprising two fixed-axle propellers, each with its own rudder, located to port and starboard (respectively) of the keel. In this simulation, starboard propeller 205 is generating a forward thrust, and port propeller 206 is generating a reverse thrust. The relative effect of director on net thrust varies significantly. Director 220 imparts a much larger lateral thrust than director 720. Additionally, the reverse thrust of propeller 206 generates a complex flow field hull flow field 410 proximate to the hull, resulting (in this example) in a net lateral thrust on the hull in this area.

Figure 5:
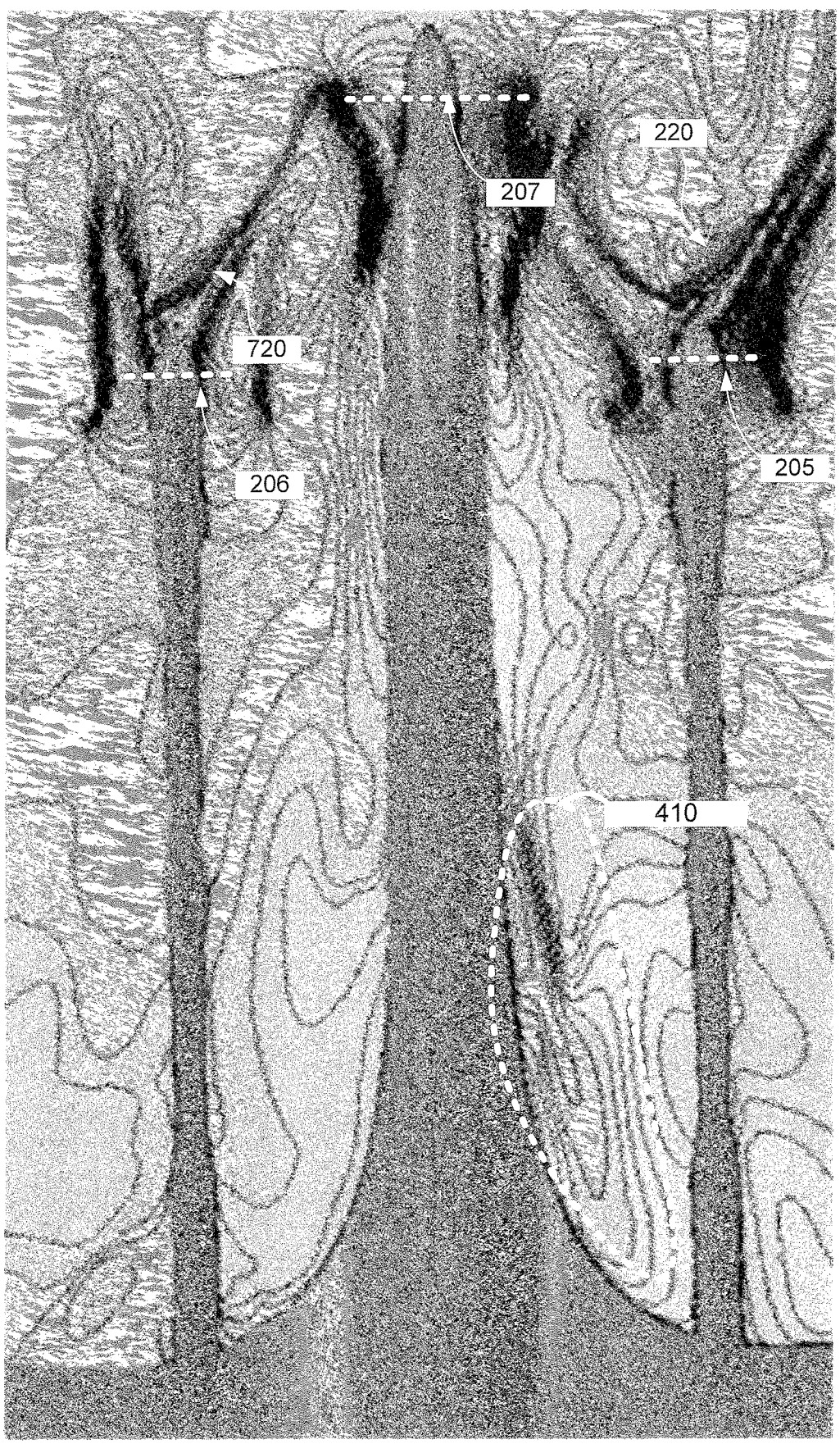
FIG. 5 illustrates a CFD simulation for a ship having a center propeller and two side propellers, each with its own rudder, according to some embodiments.

FIG. 5 illustrates a CFD simulation for a ship having a center propeller and two side propellers, each with its own rudder, according to some embodiments. FIG. 5 is a view from below the ship, looking upwards (see FIG. 8). Each of the port and starboard thrusters has a director (in this case, a rudder). In FIG. 5, "downward" on the page corresponds to "forward" in ship direction.

In this simulation, the port and starboard thrusters are thrusting aftward (to propel the ship forward) while the center thruster is thrusting forward (to propel the ship backward). In this simulation, the configuration is arranged such that the forward and aftward components of the thrusters cancel each other out, yet the lateral components do not. The net result is a sideways (with respect to the page) net thrust, moving the ship to port.

FIGS. 4B, 4C, and 5 illustrate the complexity of various flow fields. Typically, small changes in operating or environmental conditions may yield significant changes in the flow field (and thus net thrust). As such, platform 300 may use a simulated flow field as a starting point, perform various calculations with a simplified model, then update the flow field with actual behavior during operations. Using a detailed physical model of the hull and propulsion system, and simulating a range of operating and environmental conditions (e.g., engine power, ship speed, cargo load, fuel type, current, wind velocity) a large number of "canonical" flow fields may be generated and stored. Typically, hundreds to thousands (or even millions) of different simulations may be used to estimate the flow fields associated with different conditions. Thus, an expected flow fields (pursuant to those conditions) may be identified for a very wide range of conditions (low to high power, low to high speed, various wind directions, currents, and the like). These complex flow fields may then be reduced to "canonical" flow fields for those conditions.

During operation, an input set of environmental conditions, combined with a desired target heading, may be used to identify a desired set of operating conditions to yield a flow field expected to propel the ship in the desired heading. To facilitate rapid, iterative, automated control of the propulsion system, a flow field may be decomposed into canonical longitudinal and lateral thrust vectors. A match between these thrust vectors and those expected to yield the desired heading identifies the operating condition (pursuant to the environment) chosen by platform 300.

Figure 6:
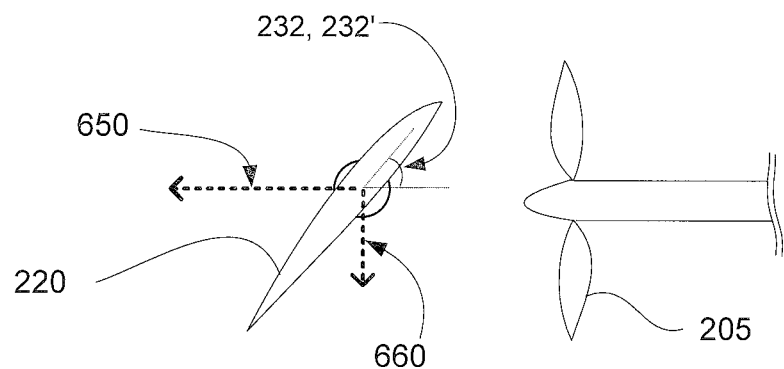
FIG. 6 is a schematic illustration of canonical thrust vectors, according to some embodiments.

FIG. 6 is a schematic illustration of canonical thrust vectors, according to some embodiments. A complex flow field of thrust vectors (e.g., FIGS. 4B, 4C, 5) may be decomposed into a long.vector 650 representing aggregate longitudinal thrust (according to the conditions of the simulation) and a lat.vector 660 representing aggregate lateral thrust (according to those conditions). These vectors may be represented as acting on the ship at an appropriate point. In this schematic example, long.vector 650 and lat.vector 660 are imparted to the ship at the center of axis 222 (FIG. 4A) about which director 220 rotates. By simulating a wide range of operating conditions, a benchmark library of long.vectors 650 and lat.vectors 660 may be generated. A typical library of different operating conditions comprises over one thousand, and typically over one million, combinations of canonical long.vectors 650 and lat.vectors 660.

Figure 7:
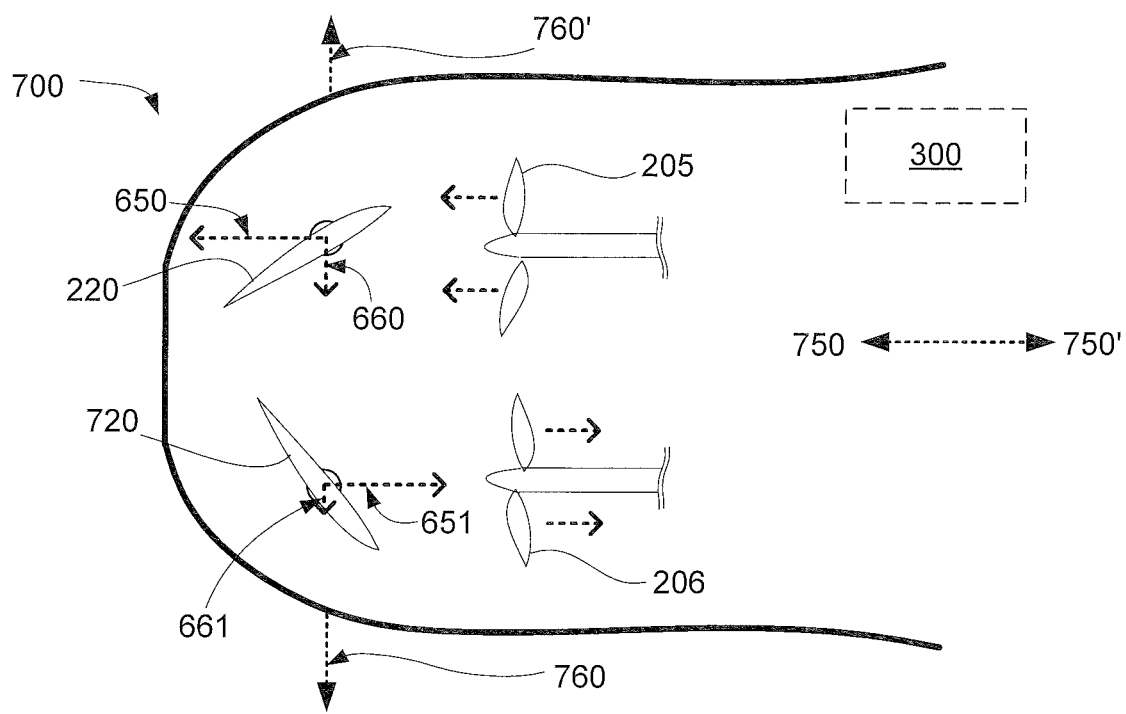
FIG. 7 illustrates a combination of net vector thrusts, according to some embodiments.

FIG. 7 illustrates a combination of net vector thrusts and their resultant headings, according to some embodiments. FIG. 7 illustrates the aft portion of a ship 700 having only port and starboard thruster/director pairs (viewed from below, e.g., at seabed looking up at the bottom of the ship). A starboard thruster 205 and director 220 are operated by platform 300, independently of a port thruster 206 and director 720. In this illustration, starboard thruster 205 generates an aftward thrust (pushing the ship forward) and port thruster 206 operates in reverse, generating a forward thrust (pushing the ship backward).

The flow fields associated with various conditions are simulated and decomposed to yield canonical thrust vectors associated with each thruster/director pair. Long.vector 650 and lat.vector 660 represent the net longitudinal and lateral thrusts acting on the ship pursuant to starboard thruster 205/director 220 (e.g., at the rotation axis of director 220). Long.vector 651 and lat.vector 661 represent the net longitudinal and lateral thrusts acting on the ship pursuant to port thruster 206/director 720 (e.g., at the rotation axis of director 720).

The vector addition of longitudinal vectors (as represented by long.vectors 650 and 651) yields a net longitudinal thrust vector 750 resulting from the two thruster/director pairs. Longitudinal thrust vector 750 is in the longitudinal direction, and moves the ship in an opposite longitudinal heading 750' (at a velocity that scales with thrust magnitude). In this example, longitudinal thrust vector 750 points backwards, thrusting the ship in a forward longitudinal heading 750'.

The vector addition of lateral vectors (as represented by lat.vectors 660 and 661) yields a net lateral thrust vector 760 resulting from the two thruster/director pairs. Lateral thrust vector 760 is in the lateral direction, and moves the ship in a lateral heading 760' at a velocity according to thrust magnitude. In this example, lateral thrust vector 760 points to port, thrusting the ship in a lateral heading 760' to starboard.

By controlling the thrusters and directors independently, a wide range of combinations of longitudinal and lateral thrusts may be created. For example, as shown in FIG. 7, the directors may be directed in opposite directions (e.g., the leading edge of director 220 angled to starboard, and the leading edge of director 720 angled to port) and the thrust directions of the thrusters may be different (thruster 205 thrusting forward, thruster 206 thrusting aftward) at a combination of director angles and thrusts that yields a long.vector 650 that cancels long.vector 651 (resulting in no forward/backward thrust) yet with a nonzero combination of lat.vectors 660 and 661. For example, longitudinal thrust vector 750 can be made to have substantially zero magnitude while lateral thrust vector 760 is finite, moving the stern/bow/ship laterally without forward/backward motion.

Figure 8:
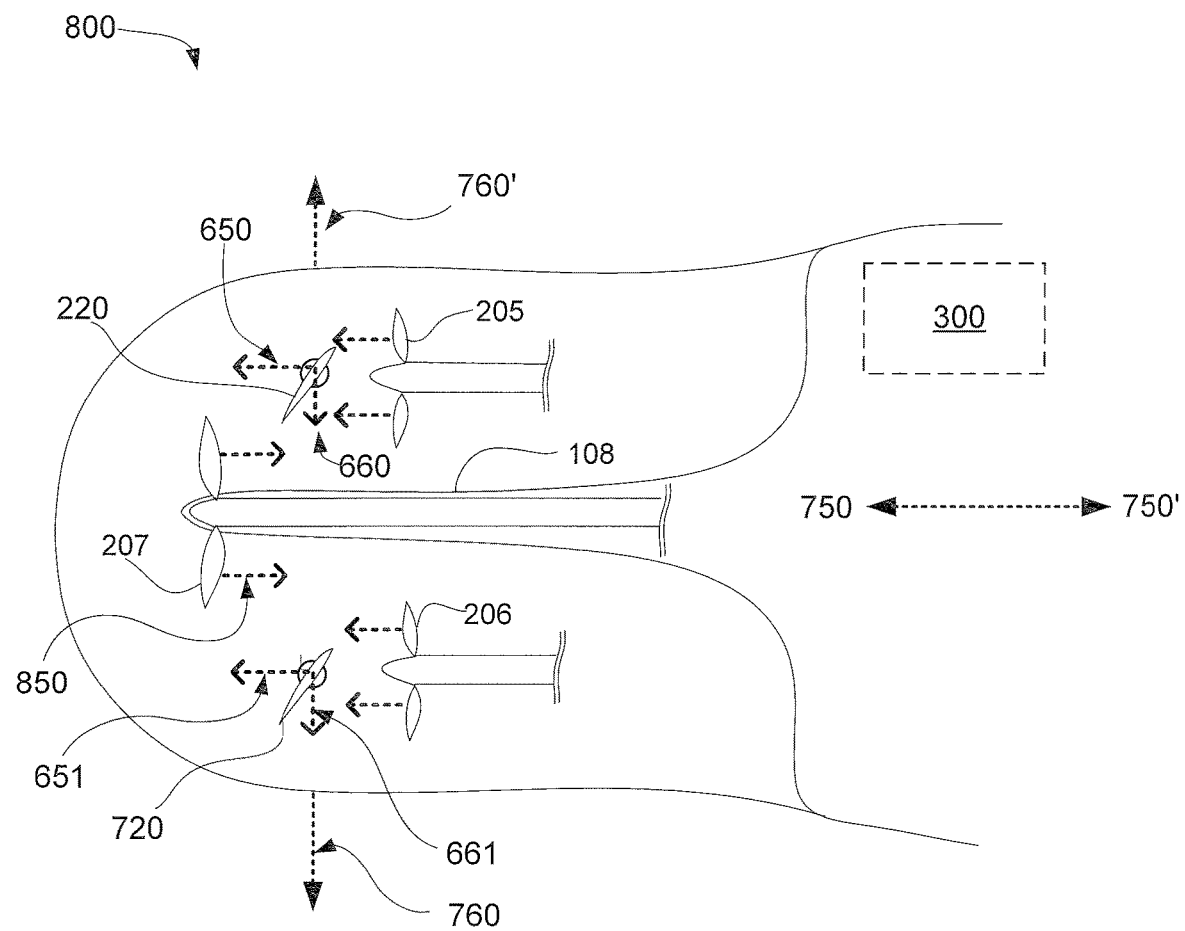
FIG. 8 illustrates a combination of net vector thrusts, according to some embodiments.

FIG. 8 illustrates a combination of net vector thrusts, according to some embodiments. FIG. 8 illustrates the aft portion of a ship 800 having port and starboard thruster/director pairs (viewed from below, e.g., at seabed looking up at the bottom of the ship). Ship 800 has three thrusters, of which two (e.g., fixed-axle propellers) include corresponding directors (e.g., rudders, although nozzles may be used). In this example, a center thruster 207 (e.g., a fixed-axle propeller) is aligned with a center of the ship (e.g., integrated into a skeg 108). Although the flow field associated with a three-thruster implementation may be more complicated than that of a two-thruster implementation, the decomposition of the flow field into canonical thrust components sufficiently simplifies the system. For ship 800, the center thruster (without a director) may generate a relatively small lateral thrust component, and this thrust is typically symmetrical (except for swirl), and so this vector is not shown. Thrust resulting from center thruster 207 may be decomposed into long.vector 850, which may be combined with long.vectors 650 and 651 to yield the net longitudinal thrust 750.

As in the configuration shown in FIG. 8, the port and starboard thrusters may both thrust in one direction (e.g., forward) while the center thruster thrusts in the other direction, yielding substantially zero net longitudinal thrust 750. However, directors 220 and 720 may be aligned to direct their thrusts in the same lateral direction, yielding (typically in combination with hull flow field 410, FIG. 4C) a nonzero net lateral thrust vector 760.

Using a combination of thrusters/directors in which certain thrust vectors cancel each other (while others do not) a ship (and/or at least the aft portion) may be navigated to move sideways without the ship moving forward/backward. A small amount of forward/backward movement may be combined with a relatively large lateral thrust. Compared to a ship in which lateral thrust is always coincident with longitudinal thrust, maneuverability may be significantly improved.

A desired combination of longitudinal and lateral thrusts 750/760 is one that yields a desired combination of longitudinal and lateral headings 750'/760'. A desired heading may be received from a joystick (e.g., operated by a pilot). A desired heading may be calculated based on a cartesian decomposition of a vector from a shipboard point to a target location, yielding desired longitudinal and lateral headings 750'/760'. Using these desired headings as "targets," a database of operating and environmental conditions (each yielding respective longitudinal and lateral thrust vectors 750/760) may be queried to select an operating condition that yields the desired heading.

Figure 9:
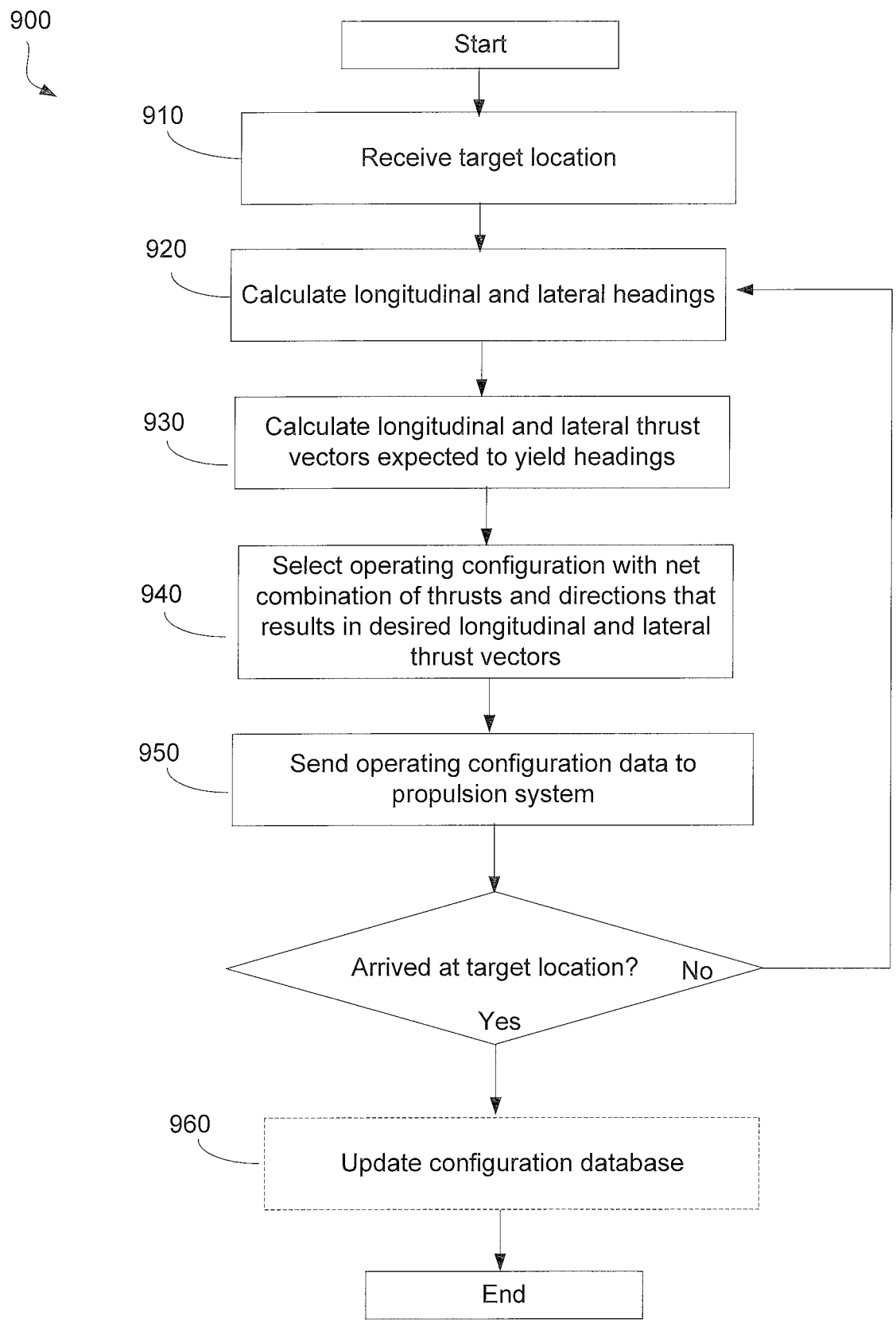
FIG. 9 illustrates a navigation method, according to some embodiments.

FIG. 9 illustrates a navigation method, according to some embodiments. Method 900 may be performed by platform 300, in cooperation with various sensors and actuators. In step 910 a target location is received. In step 920, longitudinal and lateral headings (that move the ship toward the target location) are calculated. In step 930, longitudinal and lateral thrust vectors are calculated. These vectors typically combine a direction of the thrusts (expected to yield the desired headings) and a magnitude of the net thrusts (to yield a desired velocity). In step 940, an operating configuration is selected (e.g., calculated). For example, using a database as a "lookup table" with the desired longitudinal and lateral headings as "targets" for an optimization routine (e.g., incorporating load, wind speed, ship velocity, tides, and the like), platform 300 may identify a set of operating conditions expected to yield the desired longitudinal and lateral thrust vectors, to move the ship in the desired longitudinal and lateral headings.

In step 950, operating configuration data associated with the identified operating configuration are sent to the propulsion system (e.g., by platform 300, command console 130, or a combination thereof). The propulsion system, operated according to the operating condition, may thrust the ship in the desired longitudinal and lateral headings.

The system may iteratively monitor and control propulsion. For example, the system may periodically (e.g., every second, every 0.1 seconds) measure ship location and determine whether or not the ship has reached its target location. If not, an updated set of longitudinal and lateral headings are typically calculated (and various ship sensor and environmental sensor data may also be updated). A correspondingly updated set of longitudinal and lateral thrust vectors are calculated, and an updated operating condition (expected to yield the updated thrust vectors) is identified.

Location sensing may be used to dynamically update the database of operating configurations. By comparing the expected result of imparted thrust (i.e., the actual headings) vs. the predicted headings, and associating this comparison with various ship and environmental conditions, the accuracy of the operational configurations may be improved. Typically, the map of operating conditions (and associated thrust vectors) is dynamically updated to include actual operating data (e.g., according to wind, weather, load, waves, and the like) so that future selections may include these data when selecting an operating condition.

Figure 10A:
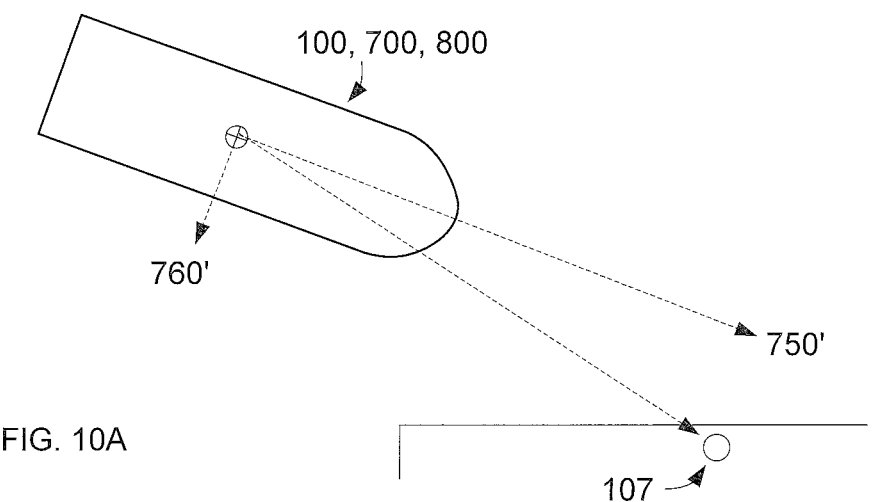
FIGS. 10A-C illustrate a simplified navigation procedure using dynamically updated longitudinal and lateral headings, according to some embodiments.
Figure 10B:
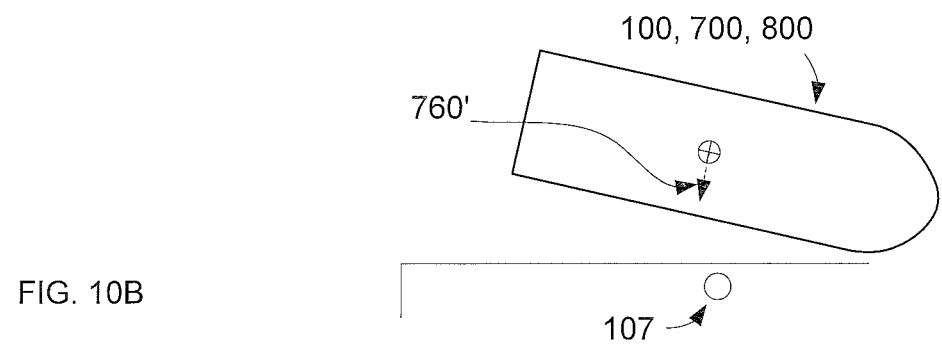
Figure 10C:
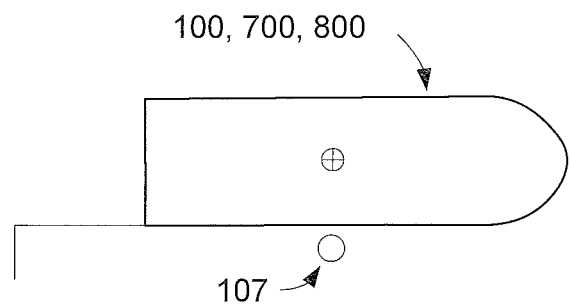

FIGS. 10A-C illustrate a simplified navigation procedure using dynamically updated longitudinal and lateral headings, according to some embodiments. For a ship navigating to a target location 107 (e.g., a point on a dock), a first longitudinal heading 750' and lateral heading 760' are calculated. Correspondingly calculated longitudinal and lateral thrust vectors are used to select an operating condition expected to yield the desired headings, and the propulsion system is operated according to the selected operating condition. After some time (FIG. 10B) updated headings are determined according to the new position of the ship. In FIG. 10B, only an updated lateral heading 760' (without longitudinal motion) is expected to move the ship in the desired direction. An updated operating condition expected to yield a lateral thrust vector yielding the updated lateral heading 760' is identified, and the propulsion system is correspondingly activated. Subsequently (FIG. 10C), the ship arrives at a "docked" position, typically at a predetermined distance and direction from target 107.

The automated independent operation of thrusters and directors, combined with closed loop updating of operating configuration (typically according to environment) may enable high maneuverability and effective autopilot. According to various environmental and ship conditions, an operating condition of the thrusters/directors is chosen that, when decomposed into canonical thrust vectors, yields a longitudinal thrust vector 750 that moves the ship in the desired longitudinal heading 750', and a lateral thrust vector 760 that moves the ship in the desired lateral heading 760'. By combining a large database of simulations and their resultant net thrusts with high computing speed, platform 300 may dynamically "find an operating condition that will move the ship in this desired heading," iteratively controlling the operating conditions in closed loop with the ship and/or environmental sensors.

The schematic maneuvers illustrated in FIGS. 10A-C might appear relatively straightforward for a small boat, a ship having azimuthing thrusters, and/or ship being piloted by one or more tugs. However, enabling such maneuvers for a large ship having fixed-axle propellers is not straightforward. The combination of hardware and instructions described herein may enable significantly improved navigational capabilities for large, fixed-axle ships. As a result, the inherent fuel efficiency of such propulsion systems is complemented by the increased maneuverability typically associated with azimuthing systems.

Figure 11A:
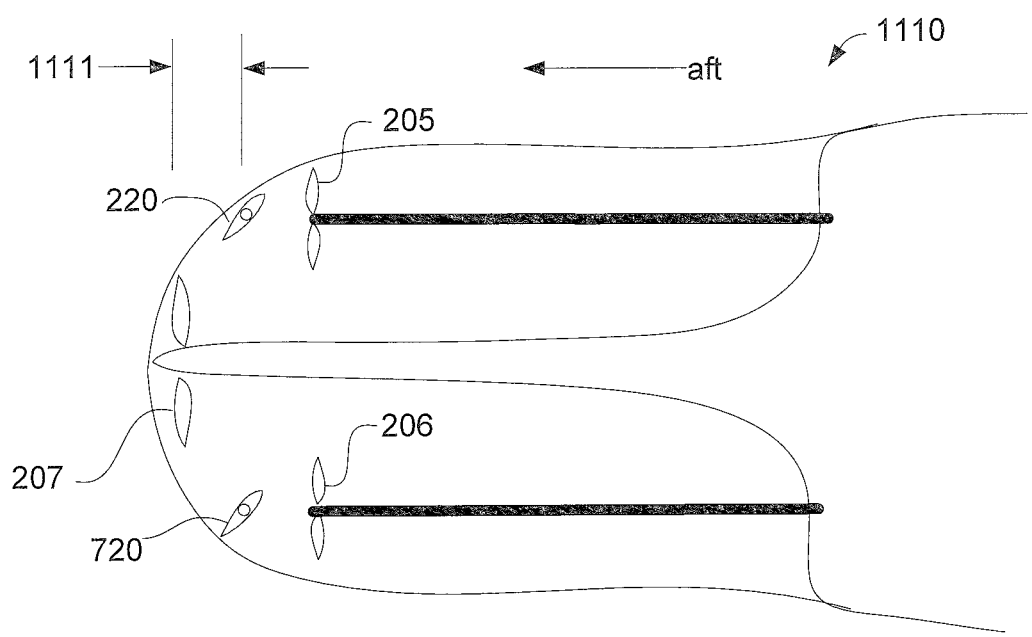
FIG. 11A illustrates a ship designed to prioritize increased fuel economy, according to some embodiments.
Figure 11B:
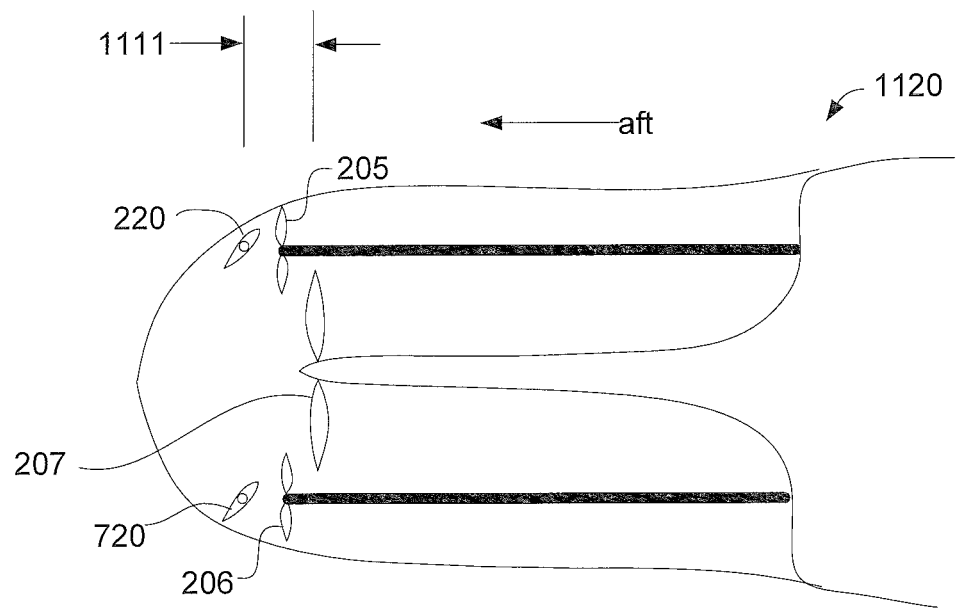
FIG. 11B illustrates a ship having a propulsion system designed to prioritize increased maneuverability, according to some embodiments.
Figure 11C:
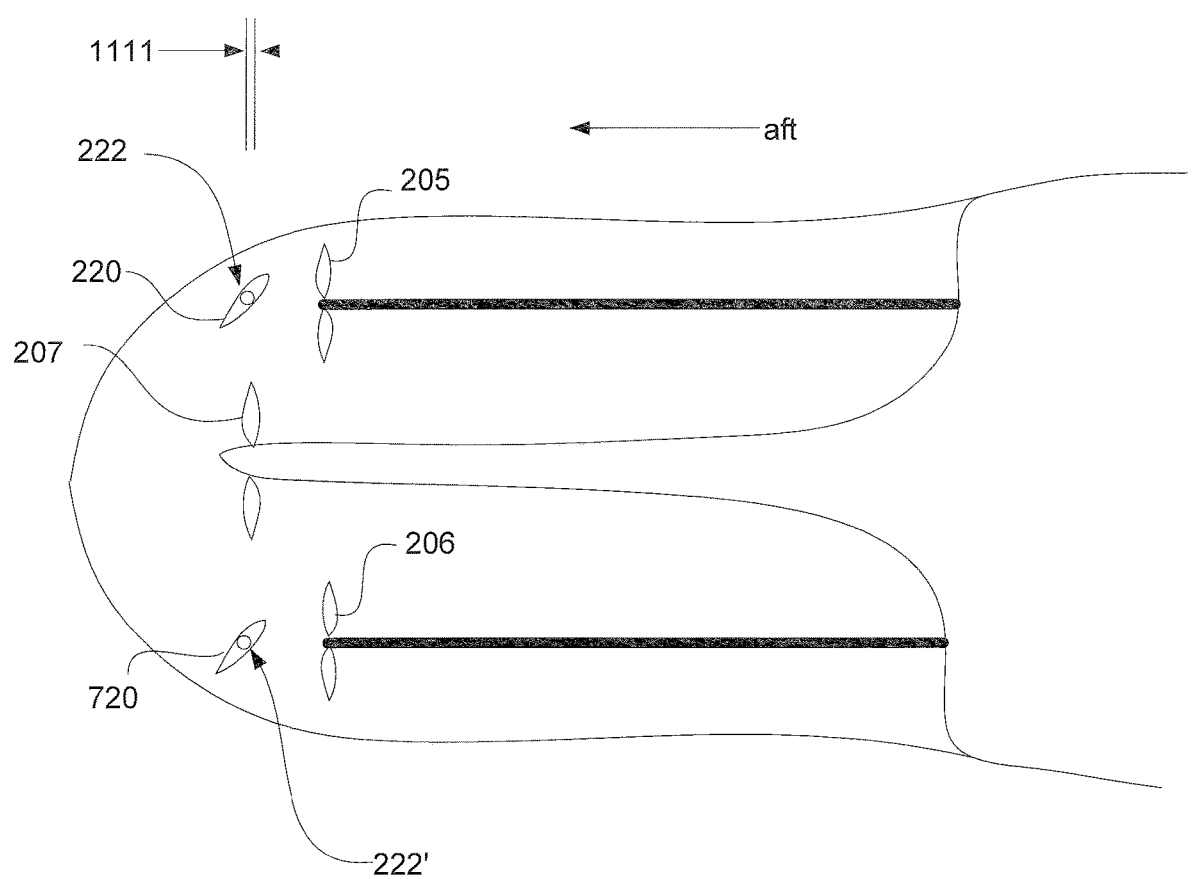
FIG. 11C illustrates a ship having a propulsion system designed to optimize the combination of fuel efficiency and maneuverability, according to some embodiments.

Certain design features may be modified according to whether fuel economy is more or less prioritized over maneuverability. In some embodiments, a longitudinal location of the port and starboard propellers relative to the center propeller is chosen according to this prioritization. FIGS. 11A-C illustrate several examples, showing a longitudinal distance 1111 between center and outward components. Various distances may be chosen; these illustrations show a longitudinal distance 1111 from a centerplane of the center propeller to rudder axes 222/222' (FIG. 4A).

FIG. 11A illustrates a ship designed to prioritize increased fuel economy, according to some embodiments. Ship 1110 comprises three propellers (center, port, and starboard), with port and starboard directors 220, 720. In this configuration, the center propeller is located as far aft as possible (e.g., the trailing edge of the propeller within a distance of the transom that is less than 10% of propeller diameter, such as substantially beneath the transom). Such a location may enable increased propeller diameter. In some cases, it is advantageous to implement a large area propeller (LAP) having a diameter greater than 50%, including greater than 80%, including greater than 90% of draft 106 (FIG. 1).

To reduce interference, the port and starboard propellers and directors are typically located as far as possible to port or starboard (as the case may be), often limited by dimensions within the hull. The lateral locations of propellers 205 and 206 are typically subject to a minimum distance inside the ship (e.g., associated with their respective engine widths) and possibly a requirement that propeller or director not extend outwards past the ship. FIG. 11A illustrates rudder axes located a substantial distance 1111 ahead of the center propeller (e.g., greater than the propeller's radius, greater than the propeller's diameter). In some embodiments, outbound components may be even farther forward, e.g., the trailing edges of the directors 220, 720 are located a similar distance 1111 ahead of the leading edge of the center propeller 207.

FIG. 11B illustrates a ship having a propulsion system designed to prioritize increased maneuverability, according to some embodiments. In ship 1120, the centerplanes of the port and starboard propellers 205, 206 are located aft of the centerplane of center propeller 207 (which may be a large area propeller). Such a configuration may allow very large director angles 232, 232' (FIG. 4A), such as above 30 degrees, including above 35 degrees, or even above 40 degrees. Interference between flow from the side propellers and that of the center propeller may be larger, and so such a configuration may require an increased number and/or complexity of the relevant CFD models. The center propeller may be located a distance ahead of the side propellers that is less than the diameter of the side propellers, including less than the radius of the side propellers. For a localized swirl (nonmotive tangential thrust) generated by the center propeller, the side propellers may be pitched to generate antiswirl, such that a portion of the swirl is locally cancelled. FIG. 11B illustrates rudder axes located a substantial distance 1111 behind the center propeller (e.g., greater than 50% of the propeller's radius, above the propeller's radius, above the propeller's diameter).

FIG. 11C illustrates a ship having a propulsion system designed to optimize the combination of fuel efficiency and maneuverability, according to some embodiments. To reduce interference among flow fields, the trailing edges of the side directors may be located aft of the centerplane of the center propeller (e.g., with their respective leading edges located ahead of the centerplane). The leading edge of the director may be located ahead of or aft of the center propeller. Ship 1130 has a propulsion system in which directors 222/222' (in this case, rudders) are located in a position (with respect to center propeller 207) that offers a combination of good fuel economy and high maneuverability. In an embodiment, the steering axes 222/222' of the port and starboard directors are longitudinally located (with respect to the center propeller) within a distance 1111 ahead or astern of the centerplane of center propeller 207 that does not exceed a diameter of the fixed-axle propeller of the port and/or starboard thruster. The steering axes of the directors may be located a distance 1111 from the centerplane of the center propeller that is less than the radius of the port or starboard propeller, including less than 50% of the radius, below 20% of the radius, or even below 10% of the radius. In the example shown in FIG. 11C, the steering axes 222/222' are substantially aligned with the centerplane of center propeller 207 (distance 1111 is very small).

Locating the steering axes of the side propellers substantially adjacent to the center propeller may offer a combination of relatively high fuel economy and high maneuverability, particularly when implemented with a large area propeller (e.g., center propeller 207). Preferably, a director angle 232/232' (FIG. 4A) of up to 35 degrees should not result in significant interaction between the flow fields of the directors and center propeller. Typically, some interaction is expected, and so the computational models used by platform 300 (FIG. 3) account for this interaction.

Various features described herein may be implemented independently and/or in combination with each other. An explicit combination of features does not preclude the omission of any of these features from other embodiments. The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A ship having a bow, a stem, a draft greater than 3 meters, and a maximum self-propelled speed that exceeds 10 knots, the ship comprising:
   a starboard thruster comprising a fixed-axle propeller configured to generate a first thrust to propel the ship forward or backward;
   a starboard director comprising a rudder and/or nozzle and configured to direct the first thrust over a range of starboard director angles;
   a port thruster comprising a fixed-axle propeller configured to generate a second thrust, independent of the first thrust, to propel the ship forward or backward;
   a port director comprising a rudder and/or nozzle and configured to direct the second thrust over a range of port director angles, independent of the starboard director angles;
   a center thruster comprising a fixed-axle propeller and configured to generate a third thrust to propel the ship forward or backward, independent of the first and second thrusts, and
   a platform comprising a processor, memory, and communications interface configured to communicate with a command console, the platform configured to:
      receive a target location toward which the ship should be propelled;
      calculate a desired longitudinal heading defining a desired forward/backward displacement of the ship to reach the target location;
      calculate a desired lateral heading defining a desired lateral displacement of the ship to reach the target location;
      calculate a longitudinal thrust vector expected to yield the desired longitudinal heading when imparted to the ship;
      calculate a lateral thrust vector expected to yield the desired lateral heading when imparted to the ship;
      select an operating configuration of the thrusters and directors that meets criteria comprising:
         a summation of:
            a first long.vector comprising a net longitudinal thrust generated by the starboard thruster and starboard director, and
            a second long.vector comprising a net longitudinal thrust generated by the port thruster and port director, and
            a third long.vector comprising a longitudinal thrust generated by the center thruster
         results in the calculated longitudinal thrust vector; and
         a summation of:
            a first lat.vector comprising a net lateral thrust generated by the starboard thruster and starboard director, and
            a second lat.vector comprising a net lateral thrust generated by the port thruster and port director
         results in the calculated lateral thrust vector; and
      send the selected operating configuration to the command console to propel the ship in the desired longitudinal and lateral.

2. The ship of claim 1, wherein the lateral thrust vector has a magnitude that is larger than the longitudinal thrust vector.

3. The ship of claim 2, wherein the longitudinal thrust vector corresponds to substantially zero forward/backward thrust, and the lateral thrust vector corresponds to a nonzero lateral thrust.

4. The ship of claim 1, wherein the selected operating configuration is such that the thrust of the center thruster is in the opposite direction to the thrusts of the starboard and port thrusters.

5. The ship of claim 1, wherein a magnitude of the longitudinal component of the thrust generated by the center thruster is within 20% of the magnitude of the sum of the first long.vector and the second long.vector comprising the net longitudinal thrusts generated by the starboard and port thrusters.

6. The ship of claim 5, wherein the magnitude of the longitudinal component of the thrust generated by the center thruster is substantially equal to the magnitude of the sum of the first and second long.vectors.

7. The ship of claim 1, wherein the selected operating configuration is such that:
   the starboard director angle is different than the port director angle; and/or
   a magnitude of the thrust generated by the starboard thruster is different than a magnitude of the thrust generated by the port thruster.

8. The ship of claim 1, wherein:
   the starboard director includes a steering axis about which the starboard director rotates to steer the ship;
   the port director includes a steering axis about which the port director rotates to steer the ship; and
   a longitudinal distance from a centerplane of the fixed-axle propeller of the center thruster to the steering axes does not exceed a diameter of the fixed-axle propeller of the port or starboard thruster.

9. The ship of claim 1, wherein the platform is further configured to iteratively:
   receive an updated position of the ship from at least one ship sensor;
   calculate an updated longitudinal heading defining the desired forward/backward displacement of the ship;
   calculate an updated lateral heading defining the desired lateral displacement of the ship;
   calculate updated longitudinal and lateral thrust vectors expected to yield the updated longitudinal and lateral headings;
   select an updated operating configuration that meets criteria comprising:
      a summation of:
         the first long.vector and
         second long.vector and
         third long.vector
      results in the updated longitudinal thrust vector; and
      a summation of:
         the first lat.vector and
         the second lat.vector
      results in the updated lateral thrust vector; and
   send the selected updated operating configuration to the command console to propel the ship in the desired updated headings.

10. A propulsion system configured to independently control longitudinal and lateral thrusts to navigate a ship, the propulsion system comprising:
   a first thruster comprising fixed-axle propeller and configured to generate a first thrust to propel the ship forward or backward;
   a first director configured to direct flowing water over a range of first director angles;
   a second thruster comprising a fixed-axle propeller and configured to generate a second thrust, independent of the first thrust, to propel the ship forward or backward;
   a second director configured to direct flowing water over a range of second director angles, independent of the first director angles; and
   a platform comprising a processor, memory, and communications interface in communication with the thrusters and directors, the platform configured to:
      receive a target location to which the ship should be propelled;
      calculate a desired longitudinal heading defining a desired forward/backward displacement of the ship to reach the target location;
      calculate a desired lateral heading defining a desired lateral displacement of the ship to reach the target location;
      calculate a longitudinal thrust vector expected to yield the desired longitudinal heading when imparted to the ship;
      calculate a lateral thrust vector expected to yield the desired lateral heading when imparted to the ship; and
      select an operating configuration of the thrusters and directors expected to propel the ship in the desired headings, the
      selected operating condition meeting criteria comprising:
         a summation of:
            a first long.vector comprising a net longitudinal thrust generated by the first thruster and first director, and
            a second long.vector comprising a net longitudinal thrust generated by the second thruster and second director results in the calculated longitudinal thrust vector; and
         a summation of:
            a first lat.vector comprising a net lateral thrust generated by the first thruster and first director, and
            a second lat.vector comprising a net lateral thrust generated by the second thruster and second director results in the calculated lateral thrust vector.

11. The propulsion system of claim 10, wherein the selected operating configuration is such that:
   the first thruster is configured to generate forward thrust;
   the first director directs the forward thrust in a port or starboard direction;
   the second thruster is configured to generate reverse thrust; and
   the second director directs the reverse thrust in the port or starboard direction.

12. The propulsion system of claim 10, wherein the operating condition includes at least one of:
   a first thrust having a different magnitude than the second thrust; and
   a first director angle that is different than the second director angle.

13. The ship of claim 1, wherein select an operating condition comprises extract data from a lookup table and/or database.

14. The ship of any of claim 1, wherein the platform configured to select an operating configuration is further configured to:
   calculate an operating configuration using an optimization subroutine, wherein the optimization subroutine is a computational method that reduces a deviation between desired and actual values, including iteratively.

15. The propulsion system of claim 10, wherein the platform is configured to iteratively:
   receive an updated position of the ship from at least one ship sensor;
   calculate an updated longitudinal heading defining the desired forward/backward displacement of the ship;
   calculate an updated lateral heading defining the desired lateral displacement of the ship;
   calculate updated longitudinal and lateral thrust vectors expected to yield the updated longitudinal and lateral headings;
   select an updated operating configuration that meets criteria comprising:
      a summation of:
         the first long.vector and
         the second long.vector
         results in the updated longitudinal thrust vector; and
      a summation of:
         the first lat.vector and
         the second lat.vector
         results in the updated lateral thrust vector; and
   send the selected updated operating configuration to the command console to propel the ship in the desired updated headings.

16. The propulsion system of claim 10, wherein select an operating condition comprises extract data from a lookup table and/or database.

17. The propulsion system of claim 10, wherein the platform configured to select an operating configuration is further configured to:
   calculate an operating configuration using an optimization subroutine, wherein the optimization subroutine is a computational method that reduces a deviation between desired and actual values, including iteratively.

* * * * *